Sept. 15, 1942.   H. E. PLEASANT ET AL   2,295,686
VALVE ACTUATING LEVER
Filed Nov. 21, 1941
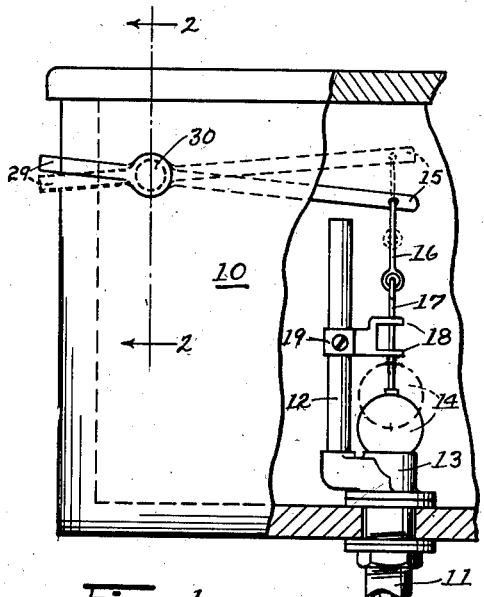
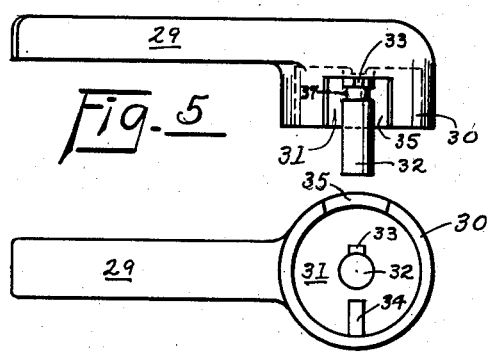
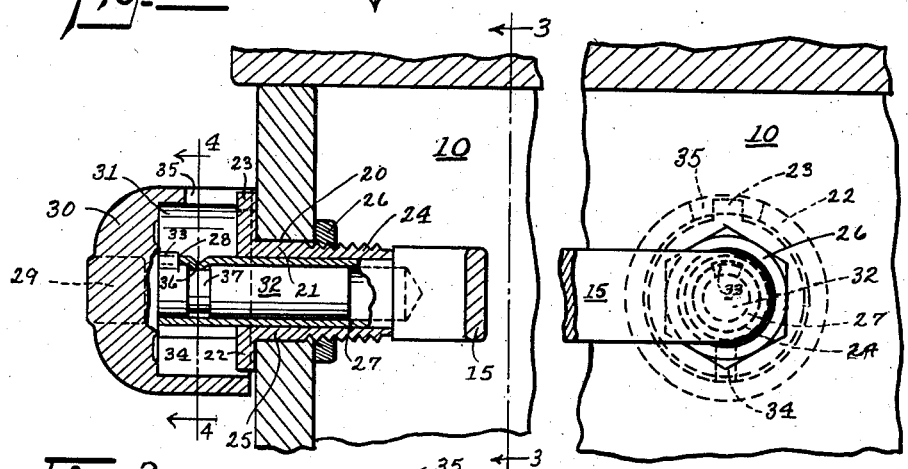
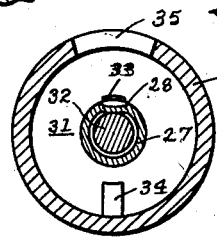
Witness:
Geo L. Chapel
Inventor
Herman E. Pleasant
Fred M. Keller
By Rice and Rice
Attorneys Patented Sept. 15, 1942

2,295,686

UNITED STATES PATENT OFFICE 2,295,686

VALVE ACTUATING LEVER

Herman E. Pleasant, Grand Rapids, and Fred M. Keller, Holland, Mich., assignors to Crampton Manufacturing Company, Holland, Mich., a corporation of Michigan Application November 21, 1941, Serial No. 419,930

4 Claims. (Cl. 4—67)

The present invention relates to valve actuating levers and more particularly to improvements in handle and valve operating lever assemblies especially adapted for use in connection with flushing tanks.

The primary objects of the instant invention are to provide an assembly of the general character above indicated which has relatively few parts; to provide such an assembly which is simple yet sturdy in construction; to provide such an assembly which is compact and efficient in use; to provide such an assembly which may be readily and conveniently affixed on the wall of a flushing tank; and, to provide such an assembly which may be economically manufactured.

Illustrative embodiments of the invention are shown in the accompanying drawing, wherein:

Figure 1 is a fragmentary front elevational view of a flushing tank, partly broken away and showing a conventional ball valve device operatively connected with its actuating lever assembly;

Figure 2 is an enlarged sectional view thereof on line 2—2 of Figure 1;

Figure 3 is a sectional view on line 3—3 of Figure 2;

Figure 4 is a sectional view on line 4—4 of Figure 2;

Figure 5 is a side elevational view of the handle of the assembly; and

Figure 6 is a bottom plan view thereof.

Referring then to the drawing wherein like parts of the assembly shown are designated by the same numerals in the several views, a flushing tank 10 of well known character having an outlet port 11, is provided with an overflow pipe 12 connected with the outlet port below the valve seat 13, all as best shown in Figure 1.

A ball valve 14 disposed upon its seat 13 as shown in full lines in Figure 1 is elevated therefrom to its position shown in dotted lines in the same view when the tank is flushed by means of the actuating lever 15 through a pair of articulated links 16, 17, the upper of which is pivotally connected to one end of the actuating lever 15 and the lower of which is rigidly secured to the ball valve 14, which lower link 17 is vertically slidably embraced within aligned vertical apertures in the fingers 18 of the bifurcated bracket 19 secured to the overflow pipe 12 in a lateral disposition relative thereto.

The front wall of the flushing tank 10 is provided with an opening 20 therethrough, preferably squared or otherwise non-circular in character, and a tubular fixture 21 projected through the opening 20 of the tank and having a flanged head 22 provided with a laterally disposed lug 23 has a threaded shank 24 and an intermediate squared or otherwise non-circular portion 25 embraced within the squared or otherwise non-circular opening 20 of the tank.

A nut 26 threaded on the shank 24 of the fixture 21 is preferably employed to secure the fixture in its assembled relation with the wall of the flushing tank 10.

The actuating lever 15 has a laterally turned tubular portion 27 whose forward end is provided with a notch 28 which tubular portion is projected through the tubular fixture 21 beyond its flanged head 22, all as best shown in Figure 2.

A handle 29 is provided with a laterally turned head 30 having a chambered recess 31 therein within which recess is a centrally disposed spindle 32, circular in cross section, which spindle has a lug 33 adjacent the floor of the chambered recess 31 (Figs. 5 and 6) adapted to engage the notch 28 of the laterally turned tubular portion 27 of the actuating lever 15 when the spindle 32 is inserted axially within the tubular portion 27 of the actuating lever.

The inner surface of the wall of the head 30 of the handle 29 is provided with a radial web 34 forming a seat for the flanged head 22 of the fixture 21 when thus assembled and a notch 35 in said wall of slightly greater width than the width of the lug 23 on the flanged head 22 of the fixture 21 provides a stop for limiting the rotative movement of the handle 29 and its actuating lever 15 relative to the fixture 21.

In the assembly of the device in operative position with respect to the flushing tank and as shown in Figure 1, the threaded shank 24 of the tubular fixture 21 is inserted within the squared or otherwise non-circular opening 20 through the wall of the tank 10 with the squared or otherwise non-circular portion 25 of the fixture 21 embraced by the squared or otherwise non-circular wall of the opening of the tank whereupon the nut 26 is threaded on the threaded shank 24 of the fixture and drawn up tight against the inner wall of the tank (Fig. 2).

The laterally turned tubular portion 27 of the actuating lever 15 is then projected through the tubular fixture 21 from inside the tank and the other end of the actuating lever is thereupon pivotally connected to the upper link 16 of the pair of articulated links (Figs. 1 and 2).

The spindle 32 of the handle 29 is next projected into the laterally turned tubular portion 27 of the actuating lever 15 with the lug 33 on the spindle 32 in engagement with the notch 28 of the tubular portion 27 of the actuating lever 15 and with the lug 23 of flanged head 22 of the fixture 21 disposed within the notch 35 in the wall of the chambered head 30 of the handle 29.

A tool is thereupon inserted through the notch 35 of the chambered head of the handle and a portion 36 of the wall of the tubular end 27 of the actuating lever 15 is upset into the annular groove 37 of the spindle 32 to prevent axial separation of the handle 29 from the actuating lever 15 (Fig. 2).

Since the handle 29 and actuating lever 15 cannot be axially separated and since the lug 33 of the spindle is tightly embraced within the notch 28 of the tubular portion 21 of the actuating lever 15 preventing turning of the handle relative to the tubular end of the actuating lever, it will be seen that tilting of the handle from its position shown in full lines in Figure 1 to its position shown in dotted lines in the same view for lifting the ball valve 14 from its seat 13 and resulting in the flushing of the tank, is limited in its tilting movement by the lug 23 of the fixture within the notch 35 of the chambered head of the handle.

It will thus be seen that the valve actuating lever assembly herein shown and described is comprised of but few parts, that the assembly is simple yet sturdy in construction, that the same is compact and efficient in use, that the same may be readily and conveniently affixed on the wall of the tank, and that the assembly is economical in manufacture since the fixture and handle may be die cast.

Although but one specific embodiment of the invention has been herein shown and described, it will be understood that certain details of the construction shown may be altered or omitted without departing from the spirit of the invention as the same is defined by the following claims.

We claim:

1. In a device of the class described, a tubular fixture adapted to be fixedly secured through the wall of a tank, said fixture having a flanged head provided with a laterally projecting lug; a handle having a chambered head rotatable on the flanged head of the fixture, said chambered head having a spindle spacedly encircled by the wall thereof which wall is provided with a notch spacedly embracing the lug for limiting the rotative movement of the handle relative to the fixture; an actuating lever having one end thereof projected through the tubular fixture into engagement with the spindle; and means for securing the lever and spindle together.

2. In a device of the class described, a tubular fixture adapted to be fixedly secured through the wall of a tank, said fixture having a flanged head provided with a laterally projecting lug; a handle having a chambered head rotatable on the flanged head of the fixture, said chambered head having (1) a spindle provided with a laterally disposed lug spacedly encircled by the wall of the chambered head and (2) a notch in said wall spacedly embracing the flanged head lug for limiting the rotative movement of the handle relative to the fixture; an actuating lever having a tubular end provided with a notch, said tubular end embracing the spindle with its notch engaging said spindle lug; and means to prevent axial separation of the handle from the lever.

3. In a device of the class described, a tubular fixture adapted to be fixedly secured through the wall of a tank, said fixture having a flanged head provided with a laterally projecting lug; a handle having a chambered head rotatable on the flanged head of the fixture, said chambered head having (1) a spindle provided with a laterally disposed lug spacedly encircled by the wall of the chambered head, (2) a radial web disposed inwardly of the wall of the chambered head forming a seat for the flanged head of the fixture and (3) a notch in the wall of the chambered head spacedly embracing the flanged head lug for limiting the rotative movement of the handle relative to the fixture; an actuating lever having a tubular end provided with a notch, said tubular end embracing the spindle with its notch engaging said spindle lug; and means to prevent axial separation of the handle from the lever.

4. In a device of the class described, a tubular fixture adapted to be fixedly secured through a wall of a tank, said fixture having a flanged head provided with a laterally projecting lug; a handle having a chambered head rotatable on the flanged head of the fixture, said chambered head having (1) a spindle provided with an annular groove therein and having a laterally disposed lug spacedly encircled by the wall of the chambered head and (2) a notch in said wall spacedly embracing the flanged head lug for limiting the rotative movement of the handle relative to the fixture; an actuating lever having a tubular end provided with a notch, said tubular end embracing the spindle with its notch engaging said spindle lug; and means to prevent axial separation of the handle from the lever comprising an upset of a portion of the tubular end of the lever into the annular groove of the spindle.

HERMAN E. PLEASANT.
FRED M. KELLER.